Sept. 5, 1933.   L. S. PFOUTS   1,925,152
APPARATUS FOR TREATING MATERIALS
Original Filed Aug. 18, 1926   12 Sheets-Sheet 1
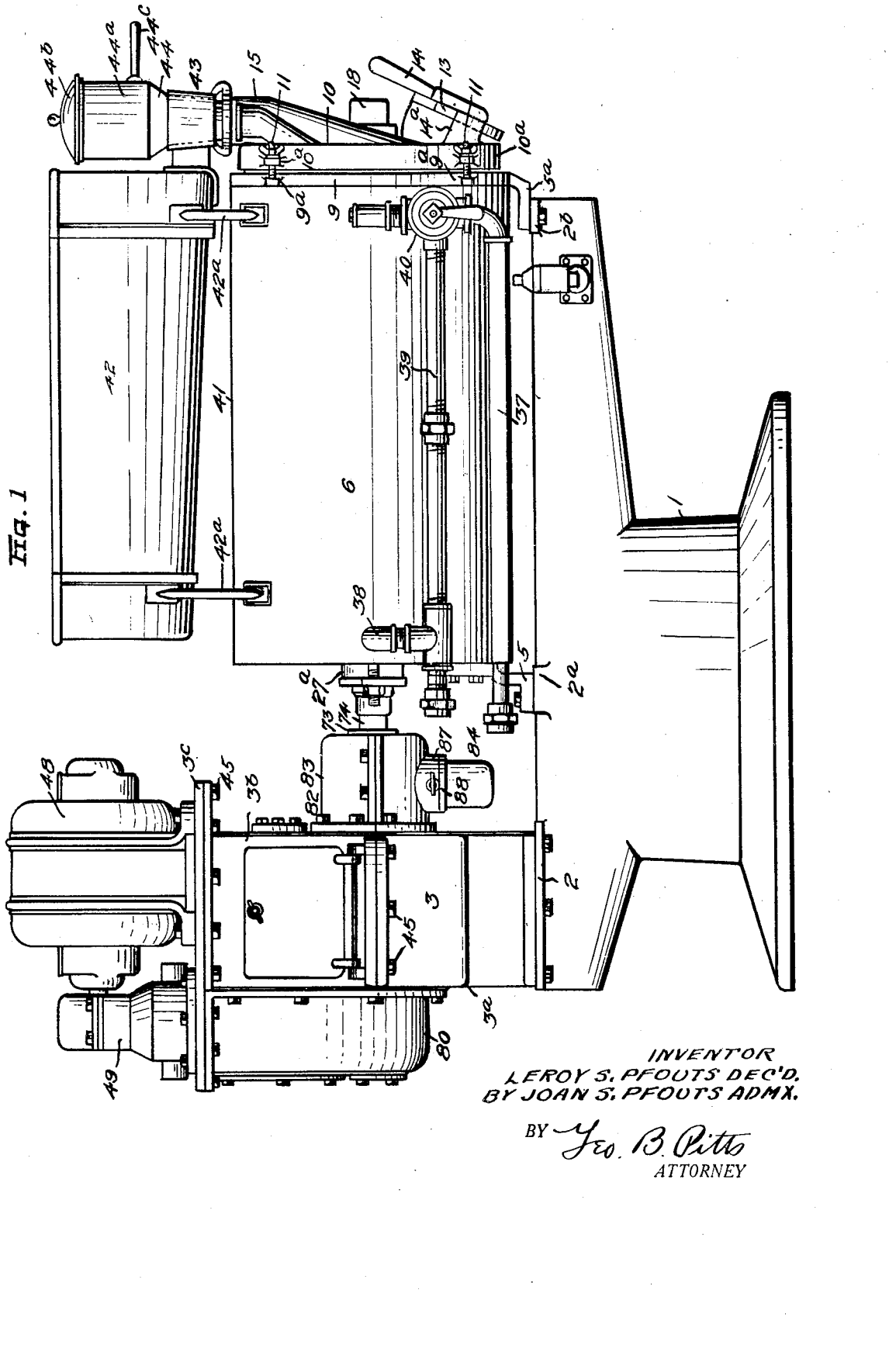
INVENTOR
LEROY S. PFOUTS DEC'D.
BY JOAN S. PFOUTS ADMX.
BY Geo. B. Pitts
ATTORNEY

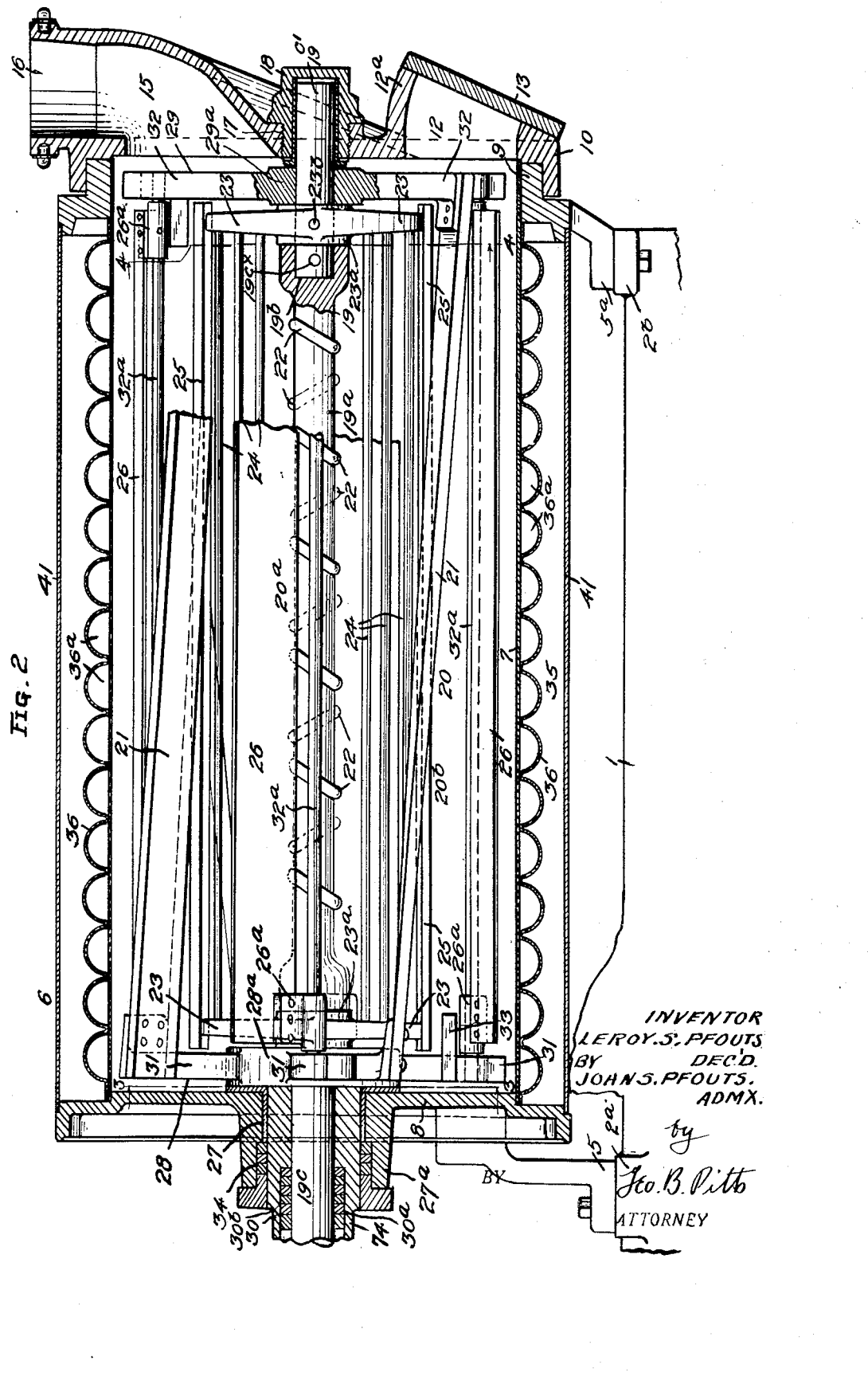

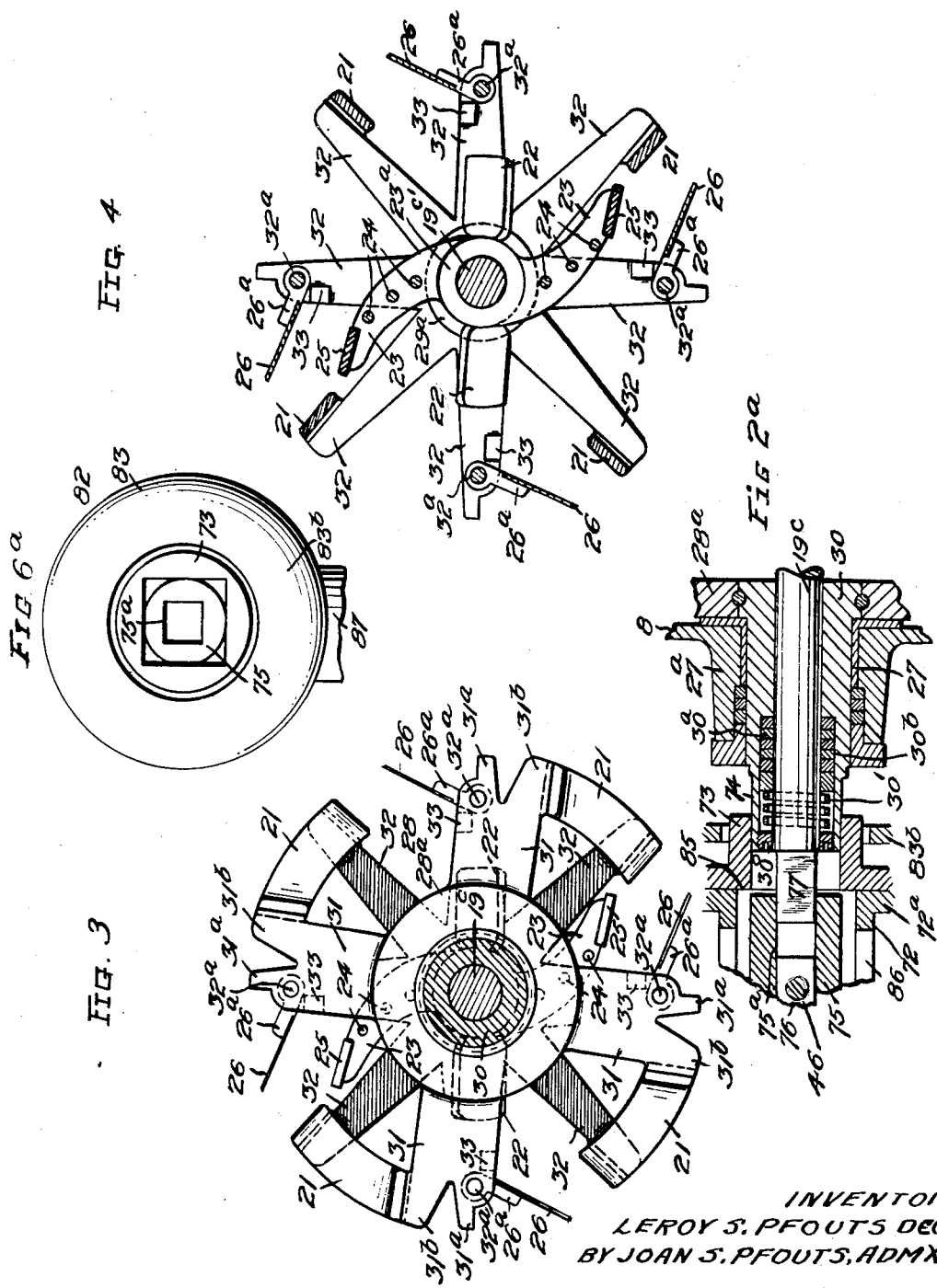

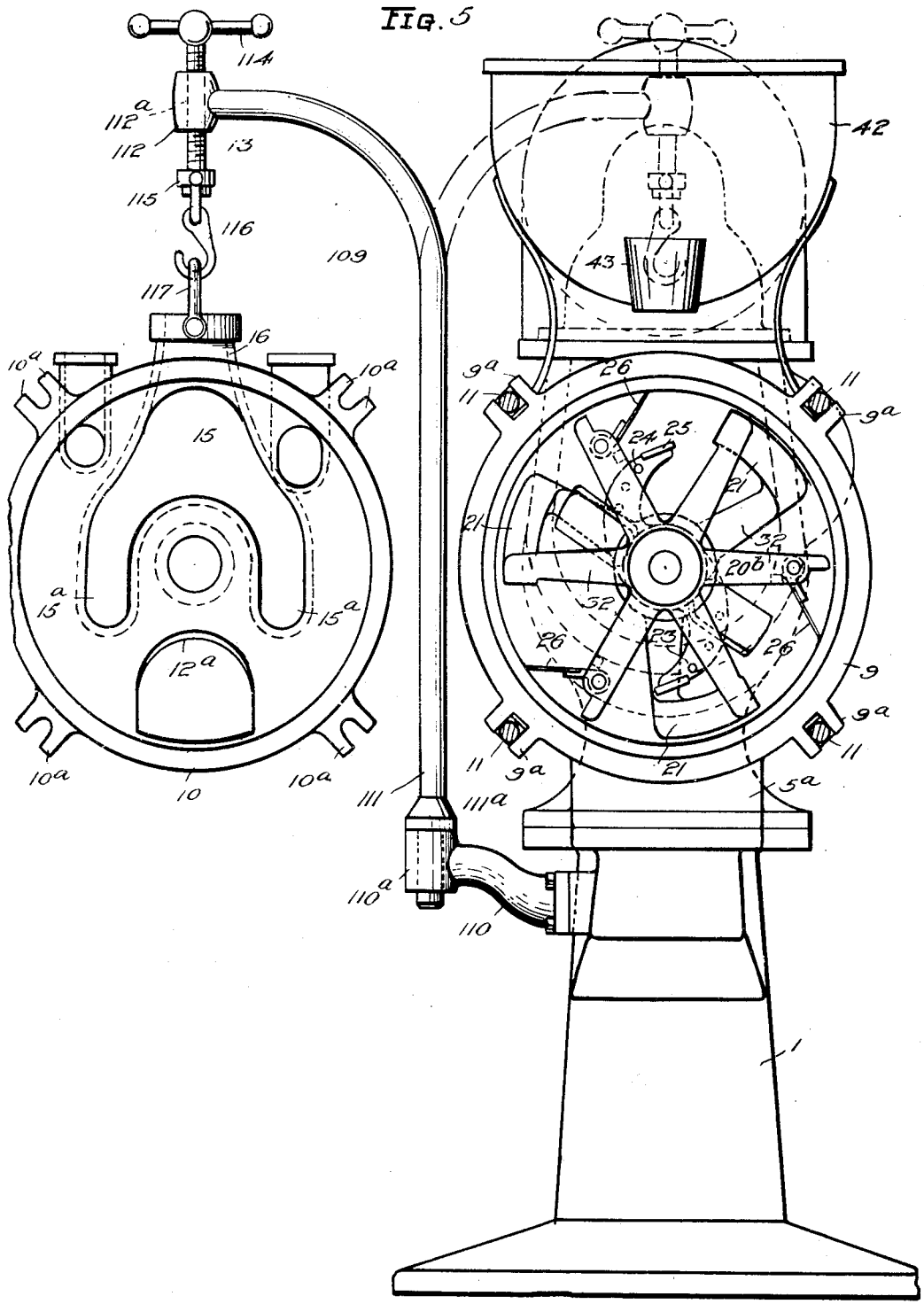

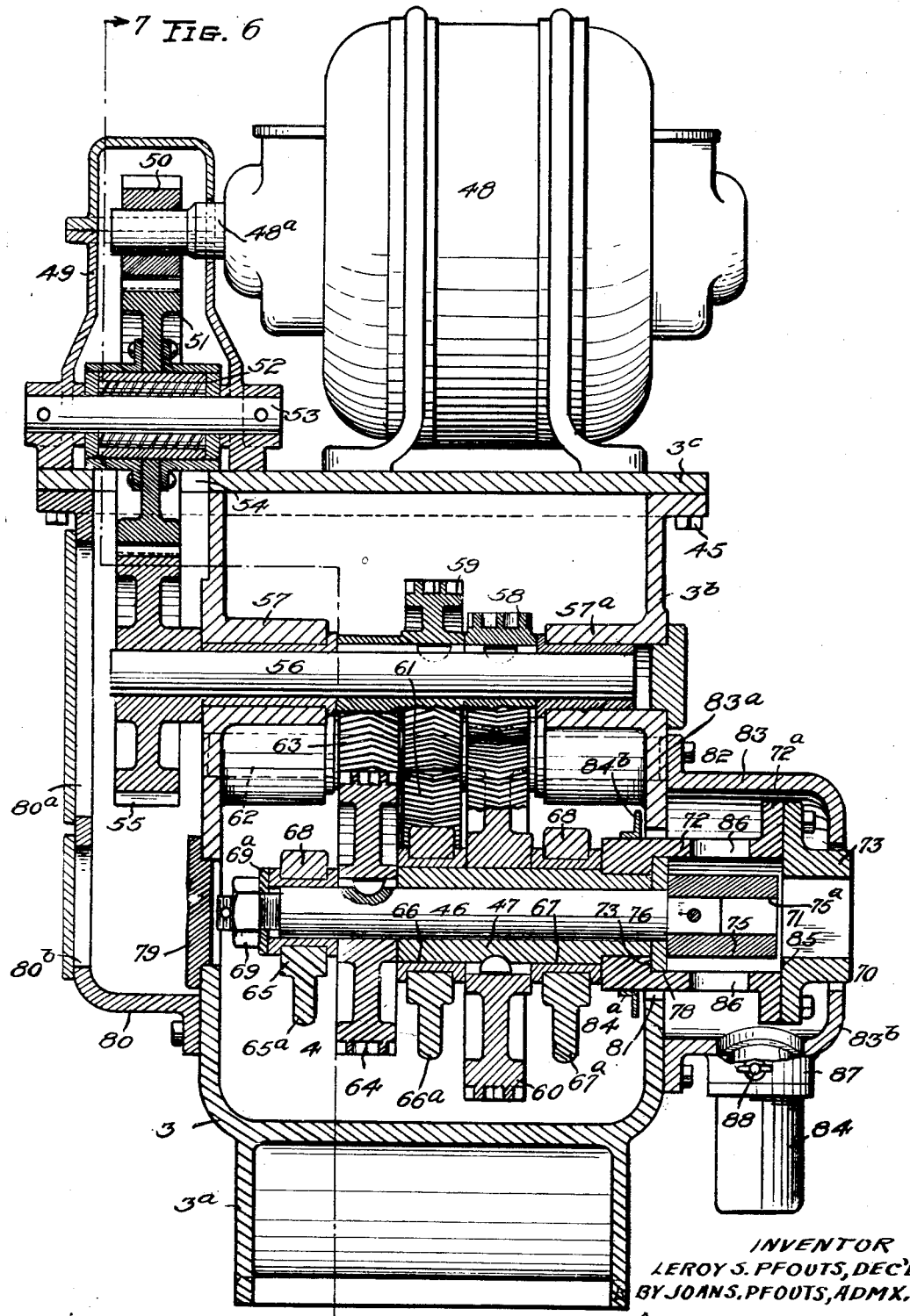

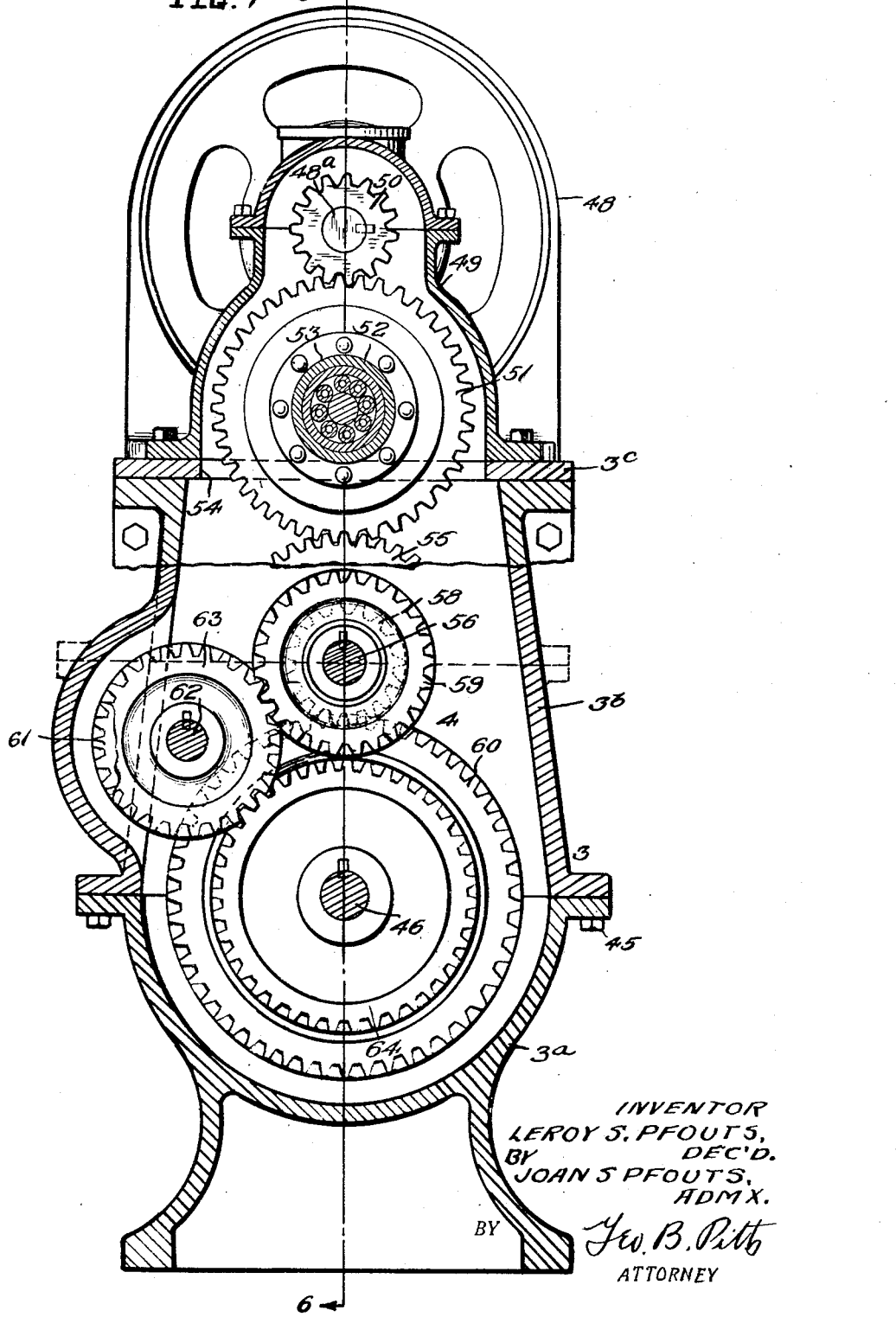

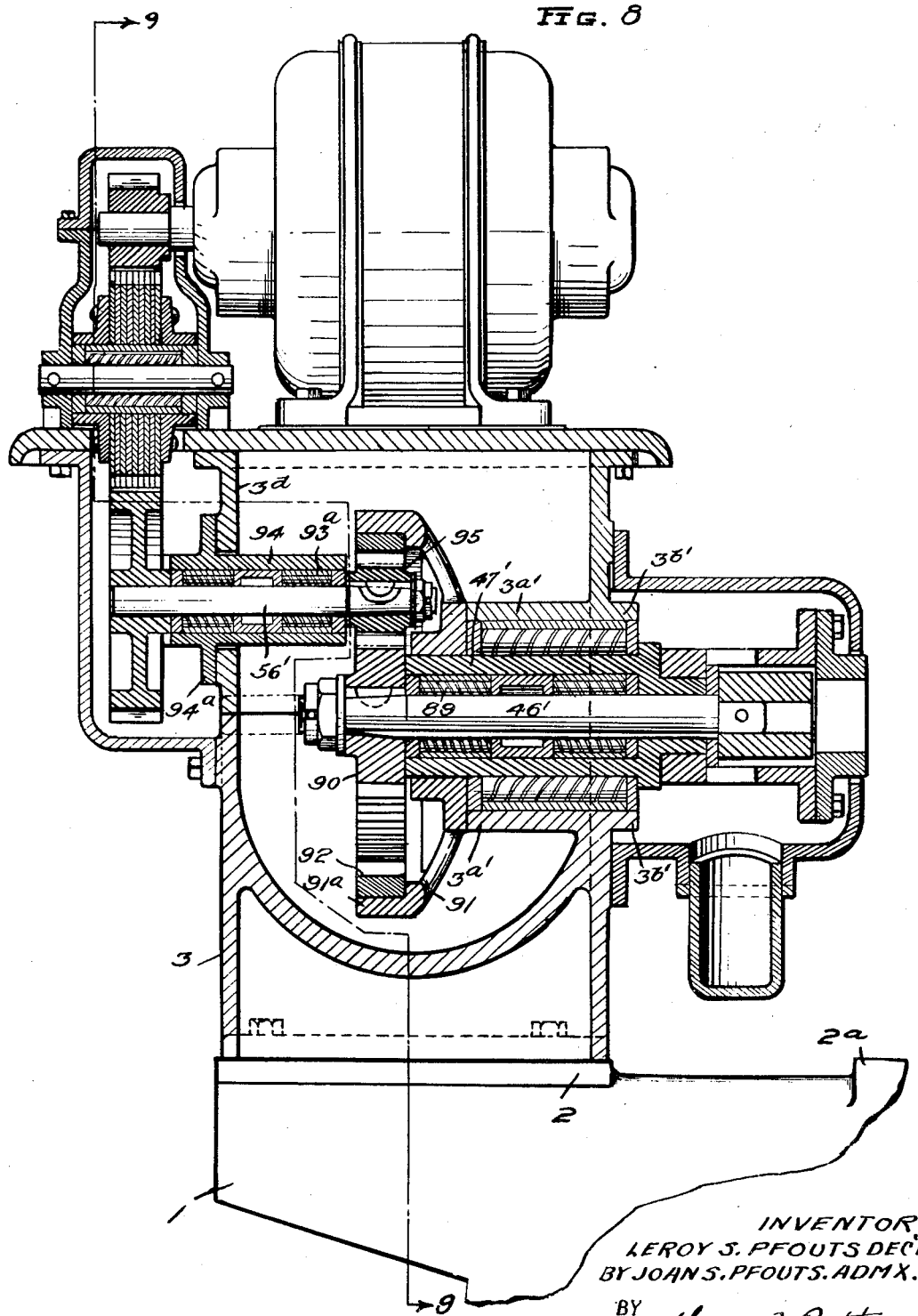

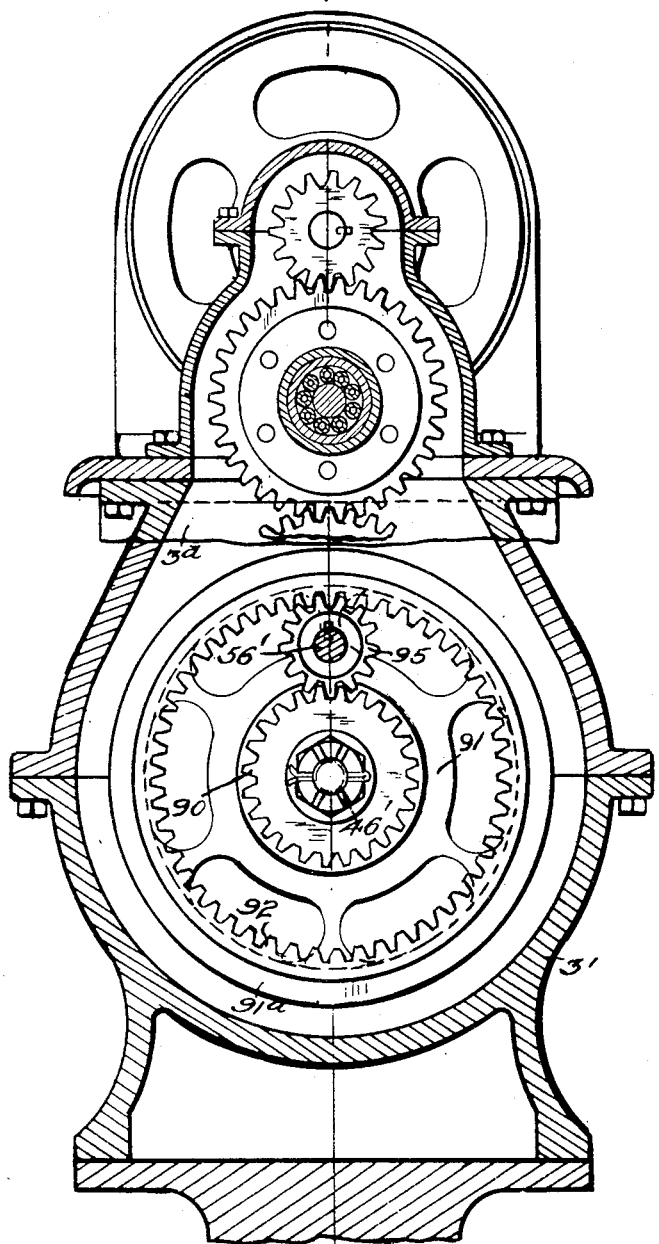

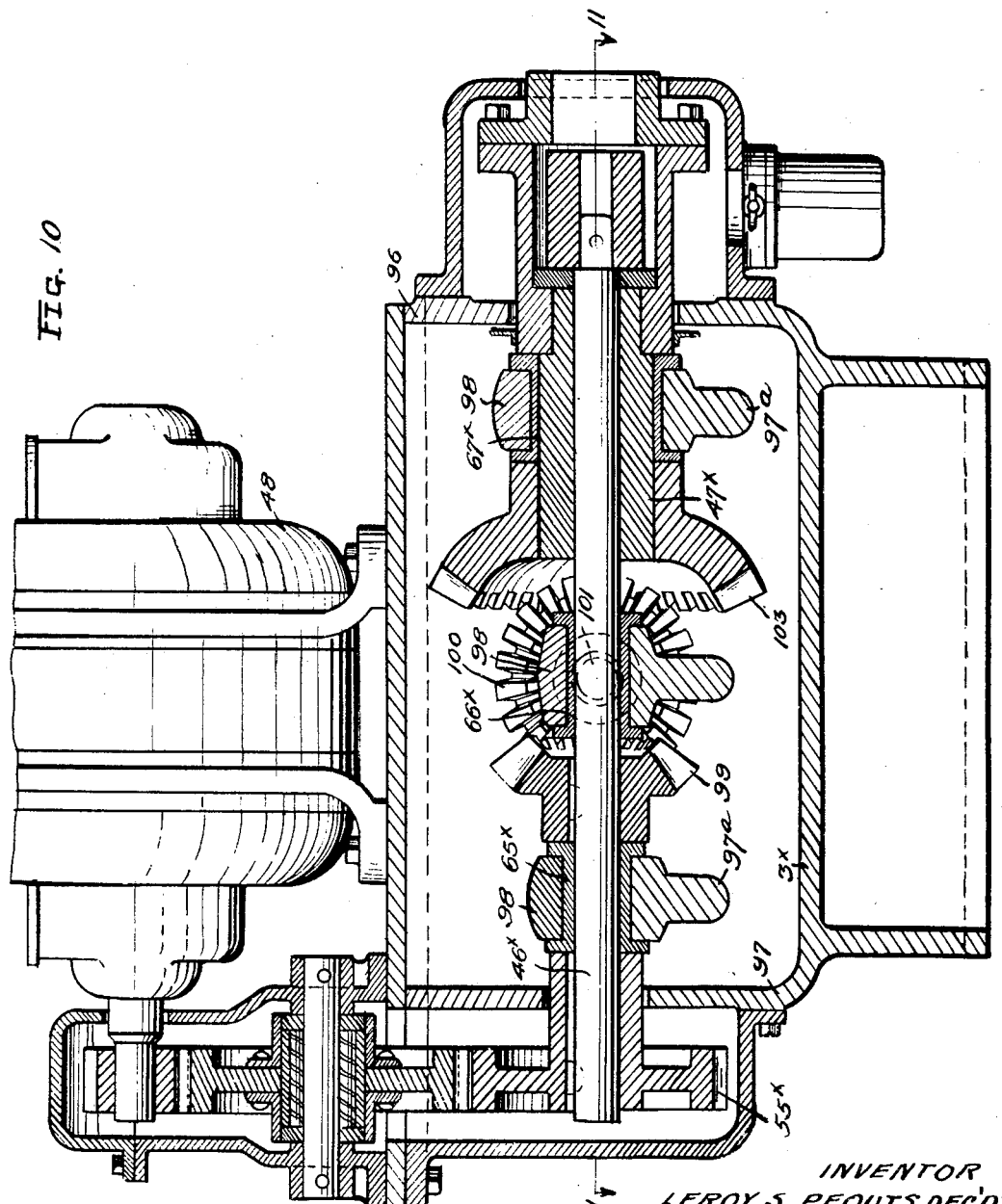

Sept. 5, 1933.   L. S. PFOUTS   1,925,152
APPARATUS FOR TREATING MATERIALS
Original Filed Aug. 18, 1926   12 Sheets-Sheet 10
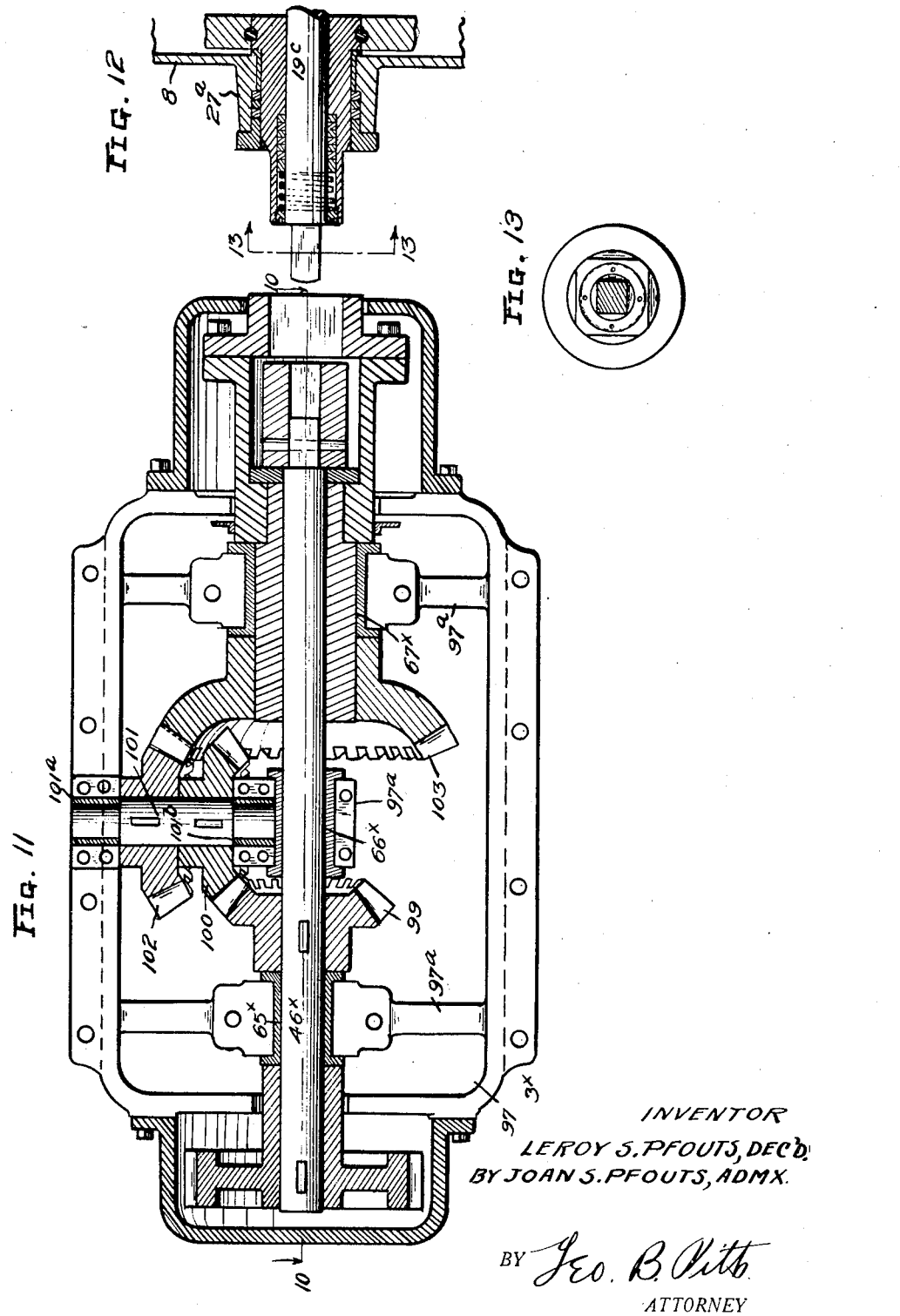
INVENTOR
LEROY S. PFOUTS, DEC'D.
BY JOAN S. PFOUTS, ADMX.
BY Geo. B. Pitts
ATTORNEY

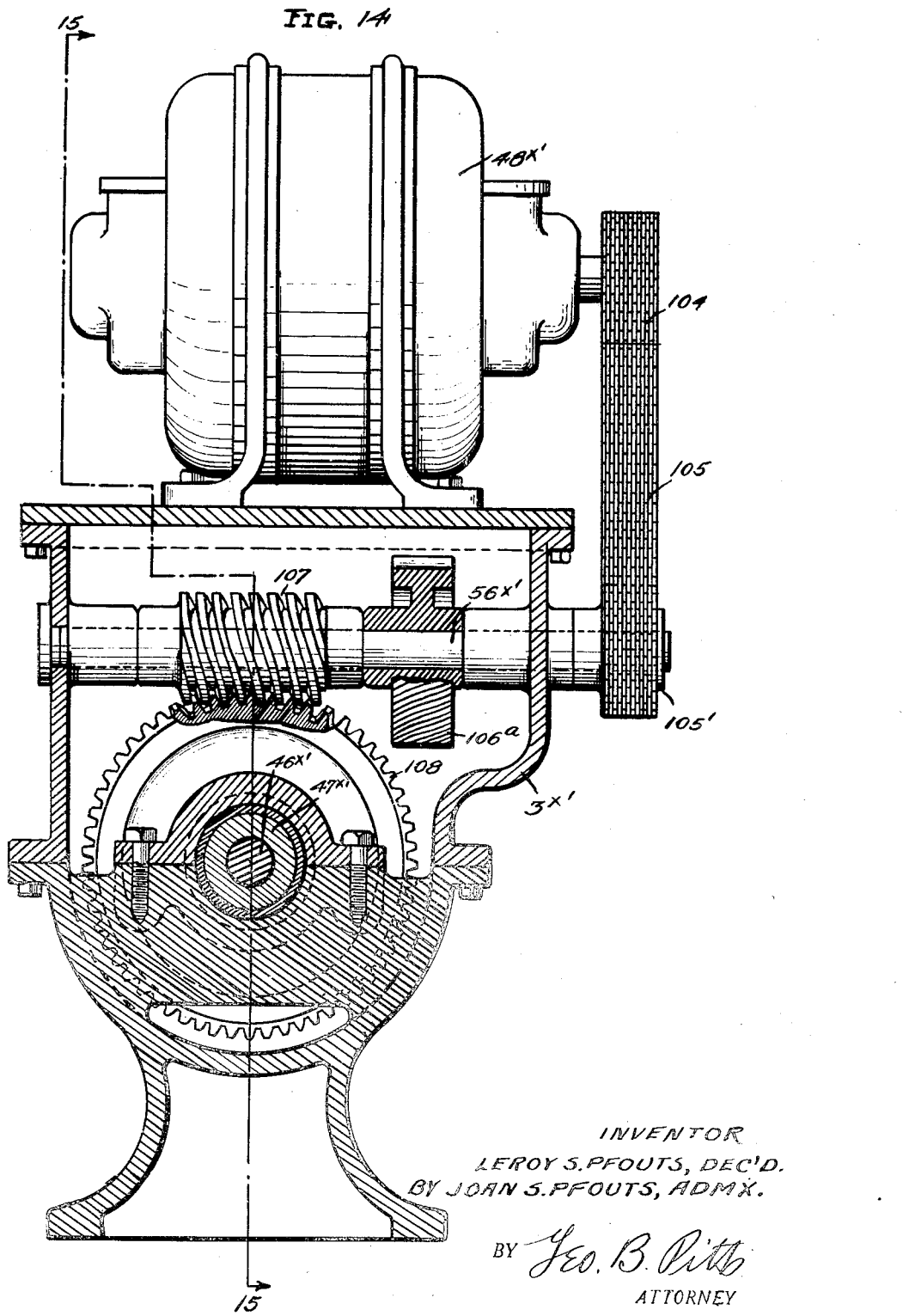

Sept. 5, 1933.  L. S. PFOUTS  1,925,152
APPARATUS FOR TREATING MATERIALS
Original Filed Aug. 18, 1926  12 Sheets-Sheet 12
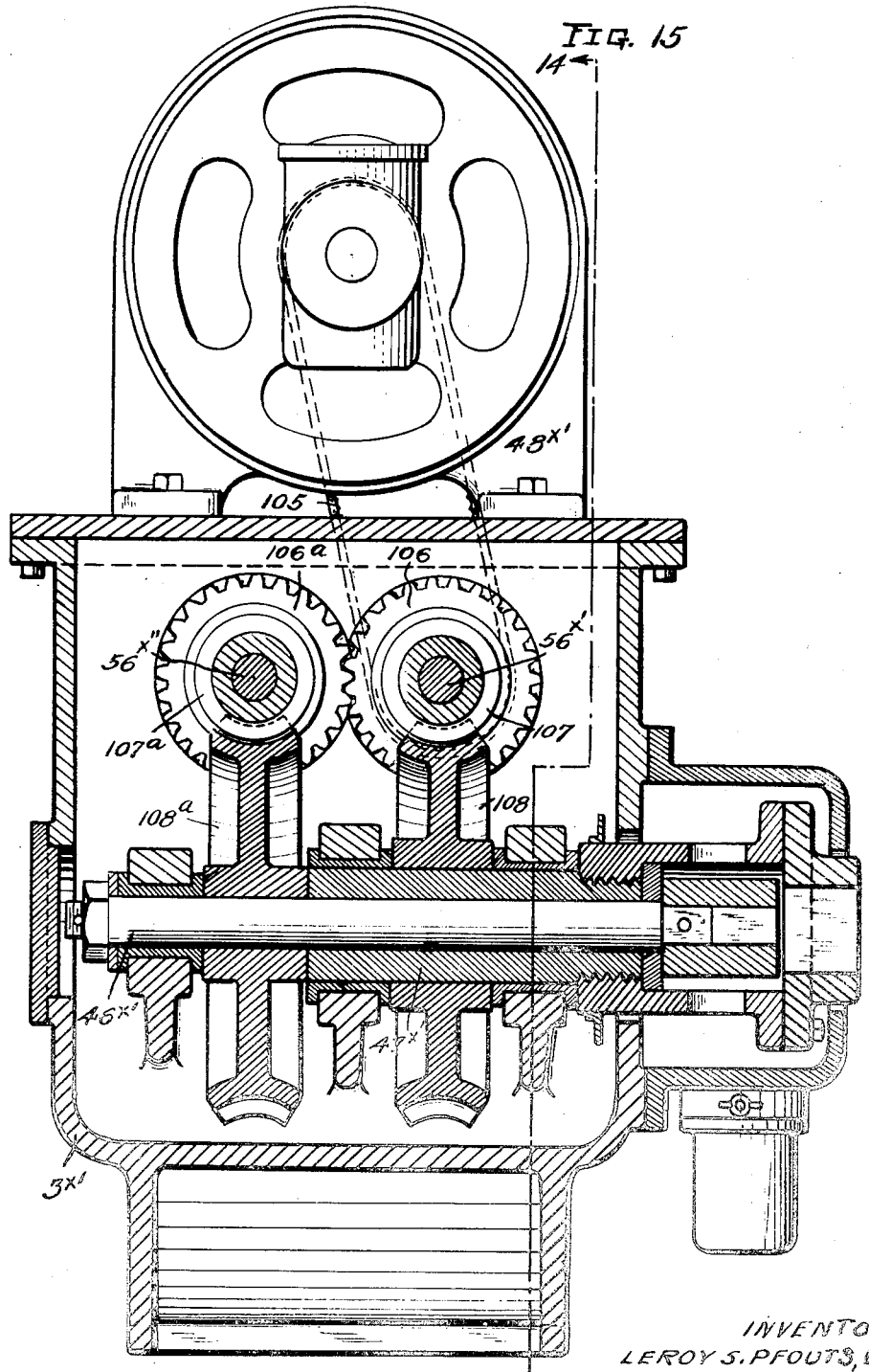
INVENTOR
LEROY S. PFOUTS, DEC'D.
BY JOAN S. PFOUTS, ADMX.
BY Leo B. Pitts
ATTORNEY Patented Sept. 5, 1933

1,925,152

UNITED STATES PATENT OFFICE 1,925,152

APPARATUS FOR TREATING MATERIALS

Leroy S. Pfouts, deceased, late of Canton, Ohio, by Joan S. Pfouts, administratrix, Canton, Ohio Original application August 18, 1926, Serial No. 129,980. Divided and this application April 14, 1930. Serial No. 444,291

3 Claims. (Cl. 259—105)

This invention relates to an apparatus for treating materials, more particularly where the materials have to be agitated for one or more purposes, for example to effect a relatively quick exchange of heat throughout the entire mass of material, or to effect a whipping of air or an inert gas into the material or for mixture of the different materials. The invention is applied to the making of frozen products, including ice cream, ices, sherbets and the like, from suitable materials such as cream, sugar and a flavoring.

This application is a division of application filed Aug. 18, 1926, Ser. No. 129,980, and relates to the novel improvements therein disclosed particularly in scraping and agitating mechanism and the gearing and driving means incident thereto.

In the making of ice cream and other like products in large quantities the manufacturer has demanded (a) a freezer and a driving mechanism therefor which was relatively simple and durable, required minimum power and could be adequately lubricated without danger of the lubricant leaking into the materials to be treated and (b) a freezer of larger size, whereby he might freeze larger batches of material and thus increase the total output. In increasing the size of the freezer to take larger masses of materials to be frozen in successive batches, difficulty has been experienced in securing sufficient whipping action upon the mass of material to secure the desired "swell" and larger size motors have been required to operate the agitating and scraping mechanism within the freezing cylinder, on account of the increased size of this mechanism and the resistance of the material thereto.

One object of the invention is to overcome these conditions or disadvantages by the provision of an improved driving means, whereby durability is insured, cost of operation is materially reduced and greater power for operating on large masses of material results.

Another object of the invention is to provide an improved gearing for driving the members of a combined agitating and scraping mechanism in opposite directions at any desired speed ratio.

Another object of the invention is to provide in an apparatus of this character having a gear driving mechanism, improved means for preventing the flow of the lubricant into the freezing cylinder where it will become mixed with the material to be frozen.

Another object of the invention is to provide an improved scraping and agitating mechanism, whereby a relatively large mass of material may be treated in a short period of time.

Other objects of the invention will be apparent to those skilled in the art to which the invention relates from the following description taken in connection with the accompanying drawings, wherein Fig. 1 is a side elevation of an apparatus embodying the invention (the upper portion of the lift mechanism being broken away).

Fig. 2 is a fragmentary longitudinal section through the freezing cylinder and showing the agitating and scraping mechanism partly in elevation and partly in section.

Figs. 3 and 4 are sections on the lines 3—3 and 4—4, respectively of Fig. 2.

Fig. 5 is a front elevation showing the front head removed, said head being supported at one side by the lift mechanism.

Fig. 6 is a section on the line 6—6 of Fig. 7.

Fig. 7 is a section on the line 7—7 of Fig. 6.

Fig. 8 is a section on the line 8—8 of Fig. 9 and illustrating a different form of the driving means.

Fig. 9 is a section on the line 9—9 of Fig. 8.

Fig. 10 is a section on the line 10—10 of Fig. 11 and showing a further modification of the driving means.

Fig. 11 is a section on the line 11—11 of Fig. 10.

Fig. 12 is a fragmentary detail section.

Fig. 13 is a section on the line 13—13 of Fig. 12.

Fig. 14 is a section on the line 14—14 of Fig. 15 and showing a further modification of the driving means.

Fig. 15 is a section on the line 15—15 of Fig. 14.

In the drawings, 1 indicates a base or support preferably having seats 2, 2a, 2b, the surfaces of which may be in the same plane. The seat 2a supports a casing 3, which encloses a driving means, indicated as an entirety at 4; the seats 2a, 2b, support brackets or standards 5, 5a, which in turn support the freezer casing, indicated as an entirety at 6. The casing 6 comprises a cylinder 7 connected at its rear end to a head 8 and at its front end to a ring 9, on which is removably mounted a front head 10. The ring 9 and bracket 5a may be formed integrally (see Fig. 2). The head 10 and ring 9 have ground seats, whereby a liquid tight joint results when the head 10 is clamped in position, as shown in Fig. 2. The clamping means may comprise bolts 11 each pivoted between lugs 9a on the ring 9 and carrying a thumb-nut at its outer end to engage spaced lugs 10a on the head. In casting the head 10, its wall is shaped and constructed as follows: 12 indicates an opening formed in its lower portion. The opening 12 has a flange 12a the edge of which serves as a seat for a valve 13 preferably pivoted on the head and operated by a handle 14, the closing movement of the valve 13 being limited by a lug 14a. 15 indicates an inlet for the material or materials (for example, cream, sugar and a suitable flavoring or a "mix" of these and other food ingredients well known in the art). The inlet 15 is shown as having branches 15a, 15a (see Fig. 5), which lead downwardly to either side of a vertical plane cutting the axis of the head 10. The walls forming the inlet 15 and branches 15a extend upward and terminate in a duct or conduit 16, to which the materials are delivered, as will later appear. 17 indicates a threaded opening disposed axially of the head 10 and supporting a hollow member 18, closed at its outer end and threaded at its inner end into the opening 17. The member 18 serves as a bearing for the outer end of a shaft 19, which constitutes a part of an agitating and scraping mechanism indicated as an entirety at 20. From the drawings, it will be noted that there is shown a horizontal type of freezer, as this is the type of freezer more generally in use. Where the freezer casing is arranged in this manner, the agitating and scraping mechanism includes one or more material ejecting elements 21 (four being shown in Figs. 3 and 4 and three being shown in Fig. 5), which—in addition to their function of ejecting the frozen mass through the opening 12, upon the opening of the valve 13 at the end of the freezing operation—assist in agitating and whipping the material during the freezing operation; that is, by reason of their arrangement and shape, they move the material about the axis of the freezer casing and also endwise thereof. The agitating and scraping mechanism 20 comprises an inner member 20a and outer member 20b, which members preferably rotate in opposite directions. The inner member 20a comprises the shaft 19 (already referred to) provided with radial paddles 22 spaced along its central portion and on diametrical opposite sides of the shaft and arms 23 extending from the shaft 19 beyond the paddles 22 and disposed at right angles thereto and carrying a plurality of whipping elements 24, 25, the latter consisting of relatively wide strips arranged to move in a circular path within and closely adjacent to that described by the scrapers 26 and ejecting elements 21. The arms 23 are preferably curved rearwardly, that is, away from the direction in which they move (namely, counter-clockwise as viewed in Fig. 5), so that the strips 25 will tend to move the material outwardly, for which purpose the strips 25 are inclined, inwardly and downwardly, as shown, rather than disposed radially. The shaft 19 may be formed in sections, to wit, a center section 19a formed at its opposite ends with sockets 19b into which are fitted and rigidly secured (as by tapered pins 19c) sections 19c, 19c', the former extending through an axial opening 27 in the head 8 and connected to and driven by the driving means 4, as will later be set forth, and the latter fitting the bearing member 18 as already described. The arms 23 may be formed integrally with collars 23a and the latter fixed to the shaft by a tapered pin 23b (Fig. 2). The outer member 20b comprises spiders 28, 29, having collars 28a, 29a, respectively, disposed between the arms 23 and heads 8, 10, for reasons which will later appear. Collar 28a is keyed at 28b to the inner end of a sleeve shaft 30 loosely mounted on the shaft section 19c (see Fig. 2a) and extending through the opening 27 for connection with the driving means 4, as will later appear. The spider 28 comprises four arms 31, each bifurcated at its outer end, as shown at 31a, 31b, whereas the spider 29 comprises eight arms 32. Each bifurcation 31a is aligned with one of the arms 32 and connected thereto by a rod 32a on which is swingably mounted a scraping blade 26 (already referred to), each blade being mounted on or secured near its ends to lugs 26a having collars which loosely surround the adjacent rod 32a. 33 indicate lugs on the inner sides of the arms 31 and 32 arranged to be engaged by the lugs 26a to limit the inward movement of the blades 26. Each bifurcation 31b is connected with one of the remaining arms 32 by an ejecting device 21, which has already been referred to, these latter arms 32 being out of line with the bifurcations in order that the devices 21 may be disposed at an angle to the axis of the cylinder 7, or spirally, to effect the ejection of the frozen material, as already set forth. The rods 32a and devices 21 rigidly connect the spiders 28, 29, so that they rotate as a unit, in a clock-wise direction as viewed in Fig. 5. The opening 27 in the head 8 is surrounded by a collar or annular box 27a having an enlarged inner portion for a packing gland 34.

35 indicates as an entirety means surrounding the cylinder 7 for causing a change of temperature of the material to be treated there within, such means in the present disclosure being capable of effecting a lowering of the temperature of the materials. The refrigerating means may be of the type wherein a suitable gas is expanded within a chamber surrounding the cylinder 7, but as shown in the drawings the means 34 is constructed to effect the flow of a refrigerant, such as brine. In the preferred arrangement the cylinder 7 is surrounded with a jacket 36 having corrugations which extend spirally and co-operate with the cylinder 7 to form a brine conduit 36a having an inlet to which the supply pipe 37 is connected and an outlet to which the discharge pipe 38 is connected. 39 indicates a return pipe leading from the pipe 37 to the pipe 38. 40 is a valve for controlling the flow of the refrigerant from the pipe 37 to the inlet or to the pipe 39. 41 indicates a casing surrounding the refrigerating means 35, being connected at its opposite ends to the head 8 and ring 9 and disposed in spaced relation to the jacket 36 to form a dead air space or chamber for suitable insulating material.

42 indicates a batch tank, preferably supported by legs 42a on the casing 41. The front end of the tank is connected by a conduit with the inlet 15, whereby the material placed in the tank may flow into the cylinder 7, such flow being controlled by a valve 43. The walls of the conduit are shaped to form a seat for a rotary hollow member 44 of funnel shape terminating at its upper end in a casing 44a having a cover 44b. The side wall of the hollow member is formed with a port which cuts off or permits flow of the material through the conduit, accordingly as the hollow member is rotated by the handle 44c. By removing the cover 44b, flavoring material such as crushed fruit may be supplied to the cylinder 7 at any time during the freezing operation. The combined inlet and valve just described is fully disclosed and claimed in Letters Patent No. 1,189,620.

The casing 3 is of suitable shape and size to accommodate the driving means 4 to be later described. The casing 3 comprises a lower section 3a, an upper section 3b and a cover or top 3c, these sections being secured together by cap screws 45.

The sections 3a, 3b, preferably abut in a horizontal plane cutting the axis of the driven shafts 46, 47 (the latter consisting of a sleeve), but the section 3b may also be made in sections (see dotted lines in Fig. 7) to facilitate assembly.

Of the driving means 4, 48 indicates a motor, preferably of the electric type, mounted on the top 3c. The shaft 48a of the motor extends into an auxiliary casing 49 and within the latter it supports a pinion 50 in mesh with a gear 51. The gear 51 is preferably supported on roller bearings 52 surrounding a shaft 53. The opposite ends of the shaft 53 are mounted in the side walls of the casing 49. The top 3c extends beyond the rear wall of the casing section 3b to support the auxiliary casing 49 and is formed with an opening 54 through which the gear 51 projects for engagement with a gear 55. 56 indicates a shaft mounted in hollow bosses 57, 57a, provided on the rear and front walls, respectively, of the casing section 3b, the rear end of the shaft being extended to support the gear 55. 58, 59, indicate gears keyed to the shaft 56, the former meshing with a gear 60 keyed to the sleeve shaft 47 and the latter meshing with a gear 61 keyed to a counter-shaft 62. The shaft 62 is mounted in suitable bearings (for example, within hollow bosses) carried by the front and rear walls of the section 3b. 63 indicates a gear keyed to the shaft 62 and meshing with a gear 64 keyed to the shaft 46 at a point beyond the sleeve shaft 47 (see Fig. 6). The shafts 47, 48, are supported by a plurality of bearings (preferably three) designated 65, 66, 67; the bearing 66 being interposed between the gears 64, 60, and the bearings 65, 67, being disposed at the outer sides of the gears 64, 60, respectively. The bearings 65, 66, 67, are supported on suitable webs or bars 65a, 66a, 67a, respectively, and held in place thereon by caps 68. As shown in Fig. 6, the outer wall of each bearing is formed with an annular groove which forms a seat for the adjacent supporting bar, and the side walls of these grooves prevent lateral movement of the bearings in their supports, so that by disposing the gears 64, 60, against these bearings all tendency to move laterally or to move the shafts, to which they are keyed, endwise is overcome. Further, it will be noted that the gear 64 bears at one side against the bearing 65 and at its opposite side it bears against the outer end of the sleeve shaft 47, so that this bearing serves to prevent endwise movement of this shaft outwardly. Endwise outward movement of the shaft 46 and also the shaft 47 is prevented by the co-action of certain of the elements constituting the driving connections 70, 71, the former between the shaft 47 and the outer agitating member 20b and the latter between the shaft 46 and the inner agitating member 20a. Each driving connection preferably comprises male and female members each of the latter being connected to the adjacent shaft. At its outer end, the shaft 46 is threaded to take a nut 69, which acts through a washer 69a to engage the bearing 65 to prevent endwise movement of the shaft inwardly. Of the driving connection 70, 72 indicates a hollow member secured at its inner end by screw threads or other means, to a reduced portion of the sleeve shaft 47 and disposed in bearing relation against the bearing 67. The inner wall of the member 72 is thickened to form a shoulder 73 and the shaft 47 extends inwardly so that its inner end is in line with the shoulder 73. The purpose of the shoulder 73 will later appear. At its outer end the member 72 is flanged at 72a, which forms a seat for the female clutch or connection element 73 the opening through which is irregular or of polygonal shape (for example square) to receive the similarly shaped male connection element 74 on the free end of the sleeve shaft 30. Of the driving connection 71, 75 indicates a hollow member having an irregular or polygonal opening 75a through it and telescoped on the inner end of the shaft 46, which end is reduced and complementary shaped to fit into such opening. The member 75 is secured to the shaft end by a tapered pin 76. The shaft end extends approximately half way into the opening 75a, so that the outer portion thereof may receive the correspondingly shaped male connection element 77 provided on the free end of the shaft section 19c. 78 indicates a collar disposed on the shaft 46 between the inner end of the hollow member 75 and the inner end of the shaft 47 and shoulder 73, and serving to prevent inward movement of the shaft 47 and outward movement of the shaft 46. As shown in Fig. 6, the outer wall of the casing 3 is formed with an opening in alignment with the shaft 46 to permit of access to the nut 69 for adjustment and other purposes, this opening being closed by a removable cap 79. By preference, there is provided a supplemental casing 80 which encloses the gear 55 and cooperates with the section 3c and casing 49 to protect the gears 50 and 51. The casing 80 is formed with openings 80a, 80b, having suitable covers to permit access to the gear 55 and cap 79. 30a indicates a gland between the sleeve shaft 30 and the shaft section 19c, the shaft 30 being formed with an annular space 30b to accommodate the gland. At its outer portion, the wall forming the space 30b is threaded to removably support a ring 30c, which forms an abutment for a spring 30' normally tending to compress the gland and thus prevent leakage of the material outwardly from the cylinder 7 and of lubricant inwardly.

It will be noted that the driving means from the motor 48 to the driven shafts 46, 47, consists entirely of gears, the purpose being to simplify the driving means, to provide adequate gear reduction, to provide a driving means which requires less power or with the same power may effect operation of the agitating mechanism on larger batches of material, to eliminate wear and repairs and thus insure durability, to provide greater sanitary conditions and at the same time secure adequate lubrication and to provide for different rates of rotation of the agitating members, one with respect to the other, in a ready manner, by the interchange of one or more of the gears. Furthermore, by the use of herring-bone gears, which it is preferred to use, the same being shown in Figs. 6 and 7, there is secured smoothness and uniformity of drive, less noise in operation and longer life. Where the freezer is capable of handling 150 to 250 quarts or more of material in a single operation, these manifold advantages will be more apparent.

As shown in Fig. 7, the gear ratios from the shaft 56 to the shafts 46, 47, through the gear trains 59—61—63—64 and 58—60, respectively, are such that the shaft 46 and hence the inner agitating member 20a are driven at a faster rate than the shaft 47 and outer agitating member 20b, so that the material in or flowing into the central portion of the cylinder 6 and remote from the refrigerated wall, during the freezing operation is maintained in a rapid circulation outwardly as well as endwise of the cylinder thereby effecting rapid mixing of the materials and uniform freezing of their entire mass. Where the freezing cylinder has a relatively large diameter, the rapid rotation of the inner member will serve to maintain flow of the material outwardly toward the wall of the freezing cylinder and in the path of movement of the elements constituting the outer agitating member.

As will be understood from Figs. 6 and 7, the casing 3 is shaped and constructed to hold a quantity of oil or other lubricant for the gears which drive the shafts 46, 47. As these shafts or elements of the driving connections 70, 71, extend through an opening 81 in the inner side walls of the casing, there is provided means indicated as an entirety at 82, for preventing the flow or leakage of the lubricant onto or along the shafts 19, 30, and into the freezing cylinder 7. Of these means, 83 indicates an annular wall surrounding the connection elements 72, 73, 75, which extend through the opening 81. At its inner end the wall 83 is provided with a flange 83a which may be secured by cap screws to the adjacent side wall of the casing 3. At its outer end, the wall 83 curves or extends inwardly around the flanges of the elements 72, 73, as shown at 83b, and terminates relatively close to the outer side wall of the latter element, thus forming an opening for the element 73 and shafts 19c, 30, such opening preferably being circular so that the space between the wall 83b and element 73 may be of minimum width so as to prevent the escape of any lubricant therethrough. It will be noted that the element 72 is provided with an outwardly extending flange 72a and the wall 83b is bent inwardly relative to its free edge. By this arrangement the lubricant escaping along the outer wall of the element 72 is arrested by the flange 72a and thrown outwardly against the wall 83 and if any flows beyond the flange 72a, the inturned wall 83b will direct it downwardly; the lubricant collected by the walls 83, 83b, may flow downwardly to the bottom portion of the wall 83 and be discharged through an opening therein into a trap 84. To arrest any lubricant escaping along the element 75, there is provided the element 73 with an inwardly extending wall 85, which preferably extends beyond the outer surface of the element 75, the lubricant arrested by the wall 85 or thrown outwardly by the wall 75 being permitted to flow through openings 86 formed in the element 72 against the wall 83 from which it flows to the trap 84. The escape opening in the lower portion of the wall 83 is provided with a neck 87 into which removably fits the open end of a cup, which constitutes the trap 84, it being secured therein by a suitable thumb-screw 88. 84a indicates a collar or ring fixed to the connection member 72 within the casing 3 but closely adjacent to the inner side wall and provided with a flange 84b which projects radially beyond the walls of the opening 81 to prevent flow of the lubricant therethrough.

In Figs. 8 and 9, there is shown a modified form of gearing for driving the shafts 46', 47', adapted to be connected respectively to the inner member 20a and outer member 20b of the agitating mechanism. Referring to these views, 3' indicates the gear casing the inner side wall of which is provided with aligned hollow bosses 3a', 3b', which support the shafts 46', 47', roller bearings 89 being interposed between the shafts and between the latter shaft and the bosses to reduce the friction. At its outer end, the shaft 46' has keyed to it a spur gear 90 and the outer or adjacent end of the shaft 47' has keyed to it a spider 91 carrying in its rim portion 91a an internal gear 92 disposed in the plane of the gear 90. 56' indicates the countershaft, mounted in bearings 93a supported in a cylindrical member 94. The member 94 is provided with a flange 94a which, by means of cap screws, is secured to the outer side wall of the casing 3'. At its inner end, the shaft 56' removably carries a pinion 95 which meshes with the gears 90, 92, and hence through them and the shafts 46', 47', drives the agitating members in opposite directions. As shown, the shaft 46' is driven at a faster rate than the shaft 47'. By removing the gear 90, spider 91, pinion 95 and substituting gear elements of different sizes, the speed rates of these shafts may be changed.

In Figs. 10 and 11 there is shown a further modified form of gearing for driving the shafts 46x, 47x, adapted to be connected to the inner and outer members 20a, 20b, of the agitating mechanism. Referring to these views, 3x indicates the gear casing comprising upper and lower sections 96, 97, adapted to be secured together along their opposite sides. The lower section 97 is provided with transverse elements 97a which support the bearings 65x, 66x, 67x, such bearings being held in position by caps 98.

In this form of construction, the shaft 46x is extended through the outer wall of the casing 3x and has keyed to it the driven gear 55x. 99 indicates a bevel gear fixed to the shaft 46x and meshing with a bevel gear 100 fixed to a transverse shaft 101. The shaft 101 is supported at its ends in bearings 101a, 101b, carried respectively by the side wall of the casing 3x and an intermediate transverse element 97a. 102 indicates a bevel gear fixed to the shaft 101 and meshing with a bevel gear 103 fixed to the sleeve shaft 47x. As will be understood from the foregoing description, the gear train between the shafts 46x, 47x, serves to drive the latter in a direction opposite to that of the shaft 46x; furthermore, since the ratio of the gears 102, 103 is such that the rate of speed of the latter is reduced and that of the gears 99, 100, is substantially the same, the inner agitating member 20a is driven at a faster rate than the outer member 20b. By changing the gears, a different ratio may be effected.

In Figs. 14 and 15 there is shown a further modified form of gearing, wherein there is employed worm gears for driving the shafts 46x', 47x', which are adapted to be connected to the inner and outer members 20a, 20b, of the agitating mechanism within the freezing cylinder. In these views, 48x' indicates the motor the shaft of which carries a suitable sprocket 104 for a chain 105, preferably of the silent link type. 56x', 56x'', indicate counter-shafts mounted in suitable bearings provided in the side walls of the casing 3x', one of said shafts (for example, that designated 56x') carrying a sprocket 105' for the chain 105 whereby said shaft is driven.

106, 106a, indicate gears preferably of the spur type and similar in size, fixed to the shafts 56x', 56x'', and meshing with each other, whereby the other shaft (56x'') is driven in a direction opposite to the shaft 56x'. 107, 107a, indicate worms, fixed to the shafts 56x', 56x'', respectively, and meshing with worm gears 108, 108a, respectively, fixed to the shafts 47x', 46x', respectively, whereby the latter are driven in the opposite directions to effect a corresponding movement to the inner and outer agitating members within the freezing cylinder. It will be noted that the speed ratio of the shafts 46x', 47x' may be effected to drive the inner member faster than the outer member in various ways, for example by varying the pitch of the worm teeth between the worm 107 and gear 108 or between the worm 107a and gear 108a.

In each of the modified forms of construction above referred to, it will be noted that the shafts 46a—47a, 46x—47x and 46x'—47x', are provided with clutch elements similar to those provided on the shafts 46, 47, as shown in Figs. 5 and 6, to effect driving connections with the inner and outer agitating members 20a, 20b, and in each form of construction there is provided means for collecting and trapping the escaping oil or lubricant.

Where the freezing casing is relatively large, it is preferred to provide a hoist means, indicated as an entirety at 109 (see Fig. 5) for lifting and supporting the front head when it is removed to permit access to the interior of the cylinder 7 and removal of the agitating mechanism. Of the hoist means 109, 110 indicates a bracket fixed to the support 1 near its front end. At its outer end the bracket is formed with an opening 110a to rotatably support the lower end of a boom 111, a collar 111a being provided on the latter to engage the bracket. The upper end of the boom 111 is curved laterally so that its free end may be disposed above and substantially in line with the axis of the cylinder 7 when the boom is swung around to its operating position—see dotted lines in Fig. 5. The free end of the boom 111 is provided with a boss 112, formed with a threaded opening 112a, in which is mounted a screw threaded rod 113, carrying a crank or handle 114 at its upper end. At its lower end, the rod 113 carries a collar 115, which is preferably rotatably connected thereto, and said collar is provided with a pivoted hook 16 adapted to engage a bail 117 pivoted on the upper end of the inlet 16. By engaging the hook 116 with the bail and operating the bolts to disconnect the head 10 from the ring 9 and then operating the rod 113 to raise the head, the boom 111 may be operated to the position shown in Fig. 5.

In operation, the driving means are set in operation to rotate the agitating members 20a, 20b, and the refrigerant admitted to the brine way 36a. Then the material to be frozen, preferably a predetermined quantity, is allowed to flow from the batch tank into the cylinder, where agitation and freezing takes place. When the mass has reached the desired consistency and "swell", the valve 13 is opened and the ejecting elements 21 serve to force the material rapidly through the opening 12. In the form of agitating mechanism shown, the elements 21 serve to move the material endwise of the cylinder in one direction—outwardly—whereas the scrapers tend to move it around the axis of the cylinder and direct it inwardly; and the inner agitating member tends to move the material endwise of the cylinder (preferably in an opposite direction—inwardly) and also around the axis of the cylinder and substantially radially toward the cylinder wall. The inward, endwise movement is effected by the paddles or blades 22, whereas the circular and radial movement is effected by the elements 24, 25. The elements 24, 25, are preferably disposed at points intermediate the paddles 22 on opposite sides of the shaft 19 and the latter elements are positioned to move in a path beyond the outer ends of the paddle 22, but preferably in close relationship to the inner edges of the scrapers 26, so that portions of the material will be forced outwardly continuously at all points around the cylinder wall to replace that which is scraped therefrom by the scrapers. As a result, the temperature of the entire mass of material is quickly and uniformly reduced and the materials agitated and beaten to the desired degree.

It will be noted that in the construction of driving means for the inner and outer agitating members, the driven shafts are so arranged that their inner ends extend beyond and to a point outside the casing for such means, whereby the connections of the driven shafts with these members, through and by means of the shafts 19c, 30, are outside the casing. Accordingly, as these shafts do not extend within the casing, the free ends of the shafts 19c, 30, do not come in contact with the oil or other lubricant placed therewithin to lubricate the driving means. This arrangement is of great advantage for the reason that frequently the agitating mechanism 20 has to be removed from the cylinder 7 for sharpening the scrapers 26 or for other repairs; and if the shaft ends projected into the casing 3, they would, upon their removal, be covered with lubricant and great care would have to be exercised to clean them, the cylinder 6 and opening 27 before replacement of the mechanism 20.

It will also be noted that any lubricant that flows through the opening 81 is collected in the chamber formed by the wall 83 and flows into the trap 84, and any lubricant that leaks through on the clutch or connecting elements 75, 72, is thrown outward into this chamber and any lubricant which flows around the flanges 72a, 73a, is deflected by the wall 83 downwardly and collected in the trap. It will also be seen that in the form of construction the clutches between the agitating members 20a, 20b, and the shafts 46, 47, respectively, are outside of the freezing cylinder 7 and outside of the chamber or casing enclosing the driving means 4. This arrangement not only simplifies the operations of disconnecting these members when they are to be removed from the cylinder and re-connecting them, since among other reasons, the shaft ends are shorter, but it also tends to reduce any possible leakage of the lubricant along the shafts for these members into the cylinder and permits the provision of adequate means for collecting that portion of the lubricant that may leak from the casing 3.

To those skilled in the art to which the invention relates many changes in construction and widely differing embodiments and applications of the invention will suggest themselves without departing from the spirit and scope thereof. The descriptions and the disclosure herein are purely illustrative and are not intended to be in any sense limiting.

What is claimed is:

1. In apparatus of the class described, the combination with a support, of a cylinder having heads at its ends, one of said heads being removable, a pair of inner and outer agitating members rotatably mounted in said cylinder, means for rotating said members in opposite directions, and a hoist means on said support arranged to engage the removable head and move it to an inoperative position.

2. In a treating apparatus, the combination of a cylinder, agitating mechanism comprising inner and outer rotable members, said inner member comprising diametrically arranged radial blades tending to move the material endwise of the cylinder and intermediate devices carrying elements extending longitudinally and movable in circular paths at different distances from the axis of rotation of said member.

3. In a treating apparatus, the combination of a cylinder, agitating mechanism comprising inner and outer rotatable members, said inner member consisting of diametrically arranged sets of blades tending to move the material endwise of the cylinder and diametrically extending devices intermediately spaced between said sets of blades and carrying elements positioned to move in circular paths inwardly of the paths traversed by the elements of said outer rotatable member and beyond the ends of said blades.

JOAN S. PFOUTS,
*Administratrix of the Estate of Leroy S. Pfouts, Deceased.*